United States Patent Office 2,922,269
Patented Jan. 26, 1960

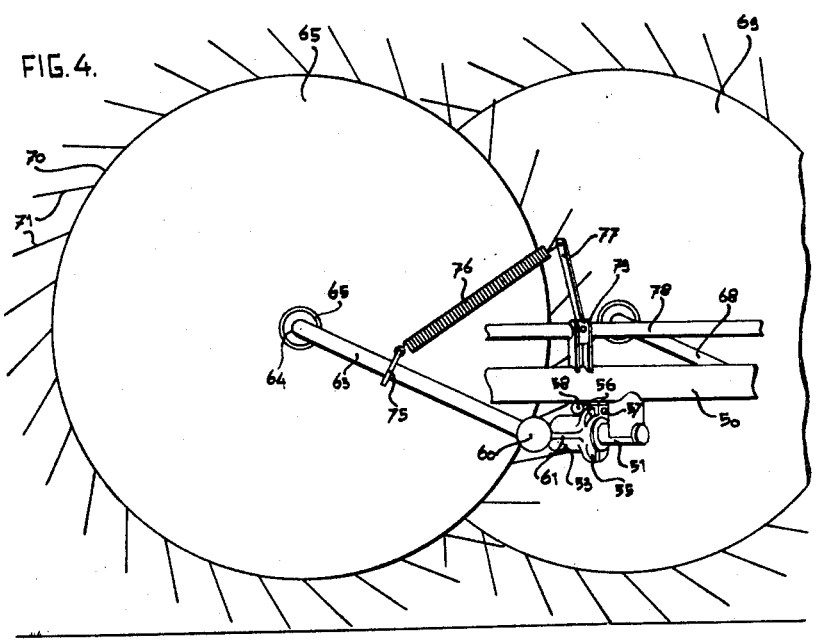
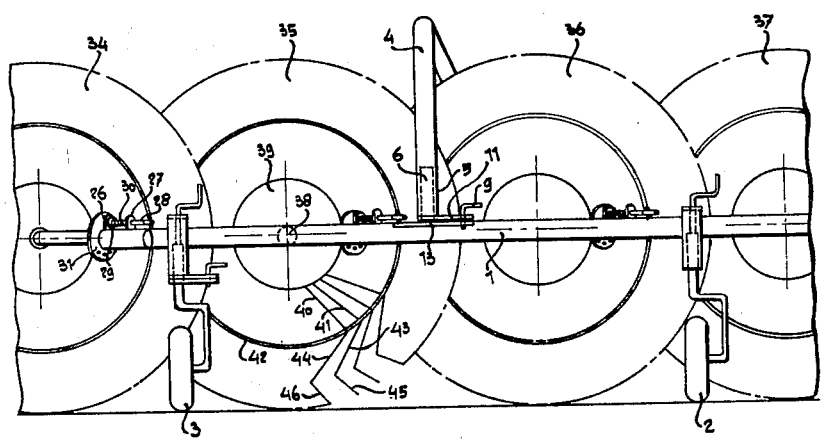

2,922,269

SIDE DELIVERY RAKING DEVICE

Cornelis van der Lely and Ary van der Lely, Maasland, Netherlands, assignors to C. van der Lely N.V., Maasland, Netherlands, a limited-liability company of the Netherlands Application January 25, 1956, Serial No. 561,232

Claims priority, application Netherlands February 11, 1955

26 Claims. (Cl. 56—377)

The invention relates to an implement for working material lying on the ground, by means of a number of raking members which are mounted rotatably about an axle of rotation on bearing members for said raking members, said bearing members being connected to the support of the implement, a bearing member being mounted rotatably about a hinge axle to the support, said implement being serviceable for more than one kind of work. Implements of this kind in which the bearing members constitute cranks for permitting the raking members to occupy a height which is independent of the height of the support, are generally known. In order to cause such an implement to perform other work, e.g. to change the implement from a side delivery rake into a swath turner, it is already proposed to turn the whole device, except for the running wheels, upside down and to move on the implement in another direction with regard to the support. It is already also proposed instead of turning the implement to an inverted position to release the raking members from their axles and to attach them again in a position turned 180° about the vertical. Turning the whole implement is very difficult, while releasing the raking members and attaching them again requires much time.

It is an object of the present invention to provide a construction in which adapting the implement to performing other work can take place expeditiously and without much effort. According to the invention the implement is such that the hinge axle of a bearing member deviates from the vertical position and makes an acute angle with the axle of rotation of the corresponding raking member, said raking member being rotatable from one of its working positions at an angle of more than 90° about the hinge axle for obtaining another working position.

Further features and details will be hereinafter more fully described with reference to the accompanying drawing in which some preferred embodiments of the device according to the invention have been illustrated by way of example and in which:

Fig. 2 represents a side elevation of the implement according to Fig. 1 seen in the direction of the arrow II.

Fig. 4 shows a side elevation of the shown portion of the implement according to Fig. 3 seen in the direction of the arrow IV.

Figure 1:
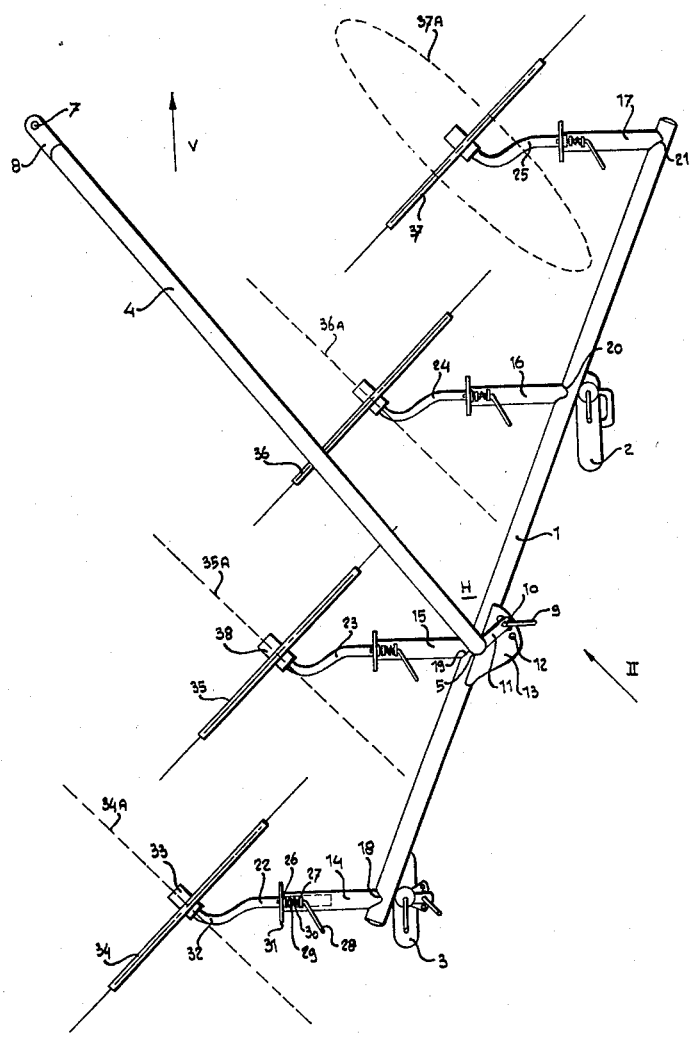
Fig. 1 shows a plan elevation of a very simple embodiment of the implement according to the invention.

According to Figures 1 and 2 an implement according to the invention comprises a support being composed of a beam 1 borne by a self-adjusting running wheel 2 and a running wheel 3 the direction of which is adjustable and of a draw arm 4 the hindmost extremity of which constitutes a bushing 5 which is hingeable about a vertical pin 6 fixedly connected to the beam 1. The implement can be connected hingedly to the back of a tractor by means of an opening 7 in the front extremity 8 of the draw arm. In operation the implement is supported by the ground by means of its running wheels 2 and 3 and on the tractor by means of the front extremity 8 of the draw arm.

The angle H between the draw arm and the beam 1 seen from above can be adjusted by removing a locking pin 9 which extends through a hole 10 in a lip 11 fixedly connected to the arm 4 and through one of a plurality of holes 12 in a plate 13 fixedly connected to the beam 1, by turning the draw arm 4 somewhat about the pin 6 and at last by putting the locking pin 9 again through the hole 10 and another one of the holes 12.

Furthermore, four parallel horizontal tubes 14, 15, 16 and 17, respectively, are fixedly connected at the points 18, 19, 20 and 21 to the beam 1. Said tubes constitute journals for rods or crank axles 22, 23, 24 and 25 which are rotatable in the tubes about the common center line of a combination of a tube and an axle, if a locking device described by way of example for the tube 14, is made inoperative. The tube 14 carries two apertured projections 26 and 27 through which a locking pin 28 is put. Said pin 28 carries a ring 29, whilst a spring 30 is situated between the ring 29 and the projection 27, said spring 30 being slidable about the pin 28. On the axle 22 is a round disc 31 which is provided with a number of holes in which the locking pin 28 can be put for adjusting the axle 22 in its position. The axle 22 defines axis of rotation 22A about which it is rotatable and comprises an S-shaped member and the free extremity constitutes an axle 32 for the hub 33 of a raking member 34. The axle 32 makes an angle of 45° with the center line of the tube 14 and is coplanar with it. The middle of the hub 33 forms practically the prolongation of the center line of the tube 14.

The axle 22 constitutes an adjustable supporting device for the raking member 34. As a matter of fact the raking member 34 can be located in the position designated by 34 and shown in full lines, but also in other positions, e.g. in the dotted line position designated with 34A which is also the axis of rotation for the raking member and which is shown in dotted lines. The axle 22 can be secured in both shown positions but may also be adjusted to other positions than those indicated by full and dotted lines in Figure 1, in accordance with the holes in the disc 31. Preferably, however, the raking member is adjusted to a position, as indicated by the several holes 31 and pin 28, most suitable for raking and then is adjusted to another position, preferably about 180° from the first position, the second position being suitable for teddering.

In the same way as the axle 22 constitutes the supporting device for the raking member 34, the axles 23, 24 and 25 constitute supporting devices for raking members 35, 36 and 37. Said raking members can also be placed into the positions designated by 35A, 36A and 37A and shown in dotted lines, as well as in some neighbouring positions and they can be locked in the same manner as has been described for the raking member 34A. The position of the raking member 37 being designated by 37A does not differ exactly 180° from the position designated by 37. This one too is a useful working position for the raking member.

It will be apparent that the draw arm 4 is led in archway over the raking member 36.

The construction of the raking members is shown more fully for the raking member 35 in Fig. 2.

The hub 38 of said raking member carries a round disc 39 to which resilient spokes, 40 and 41, are attached. Said spokes extend through apertures in a rim 42 and outside said rim they are sharply bent and constitute bearing members, 43 and 44, and tines 45 and 46. The spokes, 40 and 41, the bearing members, 43 and 44, and the tines 45 and 46 are practically coplanar, so that the tines have an equally good raking action in both directions transverse to said plane. The described fastening of the tines assures a good raking action in both directions also on uneven terrain. If the running wheel 3 is secured in the position shown and if the arm is pulled forward in the direction of the arrow V, the device works in the position 34—37 as a side delivery rake, each following raking member of which delivering to the left the material laterally displaced by a preceding raking member. If further the axles 22—25 turn about 180° in the tubes 14—17 and if they are secured in the new position, so that e.g. the raking members occupy the positions 34A—37A, whilst the running wheel 3 did not change or changed only a little its position and the device is moved on in the same manner as in the first case, the device will work as a teddering device in which every raking member displaces the material being met on a narrow strip of ground independently of the working of the other raking members over a small distance to the right, the material being fluffed or separated at the same time in a manner which is favourable for quicker drying. It is very advantageous for the raking members to have a somewhat scooping position, i.e. to have the lower part before the upper part, as is shown for the raking member 37A in Figure 1. The material is taken along to a somewhat higher level and falls down in a very airy state. It is remarked that while the bearing member of every raking member turns 180°, the raking member will topple over in such a manner that the highest and the lowest point will change places. The tines being directed downwards at the left side of the raking members in the working position of the device in which it works as a side delivery rake, are directed just upwards after having passed into the other working position, whereas in that case the tines are directed downwards at the right side. This is quite advantageous, because now in both cases the tines which release themselves from the material by moving upwards, are directed downwards and thus will carry along no material with them. Therefore it will not be necessary to mount the raking members in a reversed position on their axles.

Figure 3:
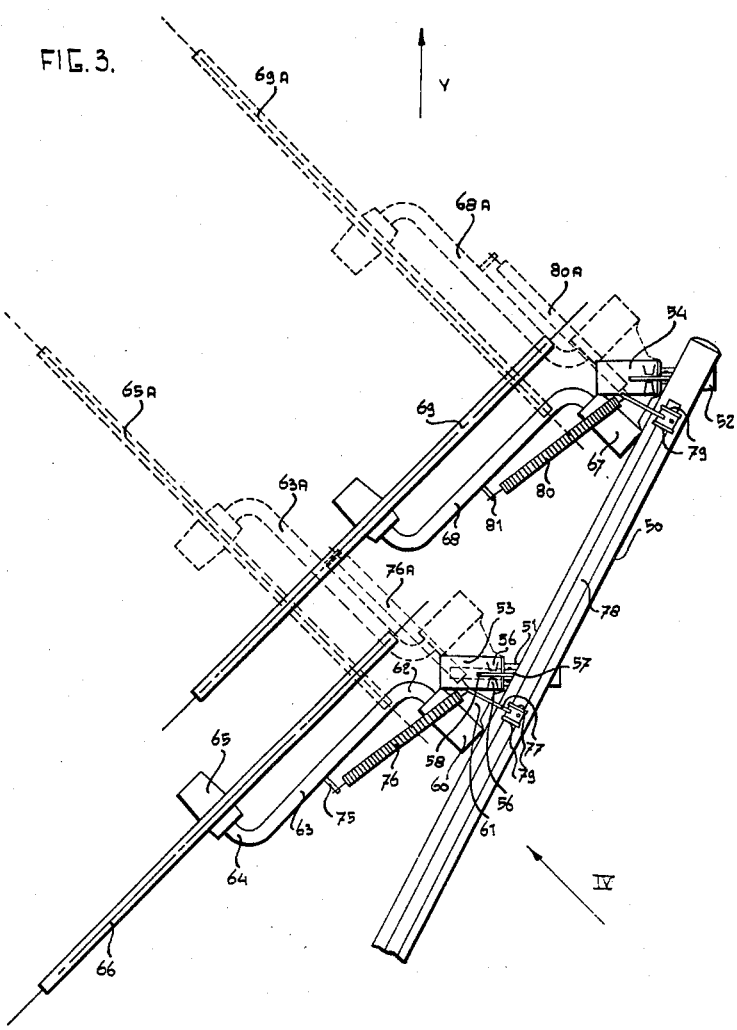
Fig. 3 represents a plan elevation of a part of another implement according to the invention, which implement is a modification of the embodiment according to Figs. 1 and 2.

Figures 3 and 4 show a part of an implement the support of which like in the implement according to Figures 1 and 2 is substantially composed of a draw arm and a beam supported by running wheels. A part of said beam designated by 50 is visible in Figures 3 and 4. Said beam carries a number of short, parallel axles, 51 and 52. Bushings 53 and 54 are rotatably applied on the free ends of said axles, said free ends being directed to the left in Figs. 3 and 4. Every bushing, as the bushing 53, carries at its lower side two cams 55 and at its upper side two cams 56. A horizontal pin 57 is connected to the support near every bushing, about which pin 57 a locking means 58 is hingeable. In the position of the bushing 53 shown in the drawing the corresponding locking means 58 lies between the cams 56 so that the bushing 53 cannot rotate. Nevertheless the locking means can be raised after which the bushing 53 can be turned. If the bushing 53 is then turned 180°, the locking means 58 can fall between the cams 55 and the position of the bushing 53 is secured again with regard to the support. The same construction and adjusting means are provided for the bushing 54 and other corresponding bushings.

A bushing 60 forms an integral part of the bushing 53 due to a triangular plate 61, said three portions can be carried out e.g. as one single casting.

The center lines of the bushings 53 and 60 intersect each other at an angle of 45°. The axle 62 of a crank 63 is hingedly supported in the bushing 60. The hub 65 of a raking member 66 is rotatably attached on the crank pin 64 of the crank 63. The center line of the crank pin 64 is parallel to the axle 62 and thus makes an angle of 45° with the center line of the bushing 53. Said angle may have a different value in other similar constructions of the implement according to the invention; preferably the angle is, however, not smaller than 30° and not greater than 60°. An angle of about 45° is a highly suited angle.

To the bushing 54 is also connected a bushing 67 which constitutes a bearing for a crank 68 which crank or arm carries a raking member 69. The crank 63, 68, respectively, constitutes with the combination of the bushings 53 and 60, 54 and 67, respectively, a supporting device for the raking members 66, 69, respectively. The raking members further being present, if any, are connected to the support beam 50 by means of bearing devices having the same construction as the described ones.

The raking members, as 66 and 69, can have a simpler construction, because the cranks 63 and 68, can see to an adaptation of the row of raking members to the unevenness of the ground. The raking member 66 consists e.g. of a flat disc 70 provided with a number of coplanar tines 71 making an angle with the radial. At a distance of the axle 62 of the crank 63 is provided with a bow 75 to which an extremity of a spring 76 is hooked. The other extremity of the spring 76 is connected to the free extremity of an arm 77 of an axle 78 which is rotatable in journals 79 fixed to the beam 50. By turning the axle 78 the tension in the spring 76 can be changed and be raised to a value which is suitable in connection with the desired pressure of the rake wheel 66 on the ground. It is also possible to turn the axle so far that the raking member 66 will entirely leave the ground. Upon rotation of the axle 78 a spring 80 for the raking member 69, said spring 80 corresponding to the spring 76, and springs for the remaining raking members are controlled at the same time.

By rotating the bushings 53 and 54 180° the raking members 66 and 69 can be put into the positions shown in dotted lines and designated by 65A and 69A. If all raking members are caused to occupy the corresponding new positions, the implement of a side delivery rake then has been transformed into a teddering device. The cranks 63 and 68 and the springs 76 and 80 occupy the positions 63A, 68A, 76A and 80A after the transformation, the extremities of the springs slide a little along the bows 75 and 81 during the toppling of the raking members. The arms, as 77, on the axle 78 are in one as well as in the other position suited for controlling the springs, as 76 and 80, because the plane in which the arm 71 moves, makes an angle of less than 45° with the vertical plane comprising the center line of the bushing 53. Like in the case of the implement according to Figures 1 and 2 the tines of the raking members have a suitable position in one as well as in the other position of the raking members.

What we claim is:

1. A device for laterally displacing a crop lying on the ground comprising a frame member, a two-part journal, the first part of said journal being mounted on the frame, the second part of said journal being selectively rotatably associated with said first part, and a rake wheel rotatably mounted on said second part of said journal at an acute angle to the axis of rotation of said second part of said journal, whereby selective rotation of the journal controls the positioning of the rake wheel.

2. A device for laterally displacing a crop lying on the ground comprising a frame member, a two-part journal, the first part of said journal being mounted on the frame, the second part of said journal being selectively rotatably associated with said first part, and a rake wheel rotatably mounted on said second part of said journal at an acute angle to the axis of rotation of said second part of said journal, whereby selective rotation of the journal controls the positioning of the rake wheel, said second part having a second axis of rotation and said rake wheel rotatably mounted on said second part about said second axis of rotation.

3. The structure of claim 1 wherein means is provided for fixing in position the rake wheel in at least two different positions, one of said positions being 180° from said other position.

4. The structure of claim 2 wherein means is provided for fixing in position the rake wheel in at least two different positions, one of said positions being 180° from said other position.

5. The structure of claim 1 wherein means is provided for fixing the rake wheel in a plurality of different positions, said means including means for positioning the rake wheel in a position out of contact with the ground and in a plurality of different positions in contact with the ground.

6. The structure of claim 2 wherein means is provided for fixing the rake wheel in a plurality of different positions, said means including means for positioning the rake wheel in a position out of contact with the ground and in a plurality of different positions in contact with the ground.

7. The structure of claim 1 wherein the second part of said journal may be selectively rotated with relation to said first part, whereby said wheel may be fixed in position to operate as a side delivery rake wheel and may be adjusted to a position about an axis of 180° from said first-named position wherein said rake wheel is a swath turner.

8. The structure of claim 2 wherein the second part of said journal may be selectively rotated with relation to said first part, whereby said wheel may be fixed in position to operate as a side delivery rake wheel and may be adjusted to a position about an axis of 180° from said first-named position wherein said rake wheel is a swath turner.

9. The structure of claim 1 wherein said second part of said journal includes a crank arm.

10. The structure of claim 2 wherein said second part of said journal includes a crank arm.

11. The structure of claim 3 wherein said second part of said journal includes a crank arm.

12. The structure of claim 4 wherein said second part of said journal includes a crank arm.

13. The structure of claim 5 wherein said second part of said journal includes a crank arm.

14. The structure of claim 6 wherein said second part of said journal includes a crank arm.

15. The structure of claim 7 wherein said second part of said journal includes a crank arm.

16. The structure of claim 8 wherein said second part of said journal includes a crank arm.

17. The structure of claim 1 wherein said second part of said journal further includes a bushing and a crank arm, said rake wheel being rotatably mounted on the said crank arm at an acute angle to the axis.

18. The structure of claim 2 wherein said second part of said journal further includes a bushing and a crank arm, said rake wheel being rotatably mounted on the said crank arm at an acute angle to the axis.

19. The structure of claim 17 wherein means is provided for adjusting said bushing with relation to said first part of said journal.

20. The structure of claim 18 wherein means is provided for adjusting said bushing with relation to said first part of said journal.

21. The structure of claim 17 wherein a spring is provided having one of its ends connected to said crank arm and its other end connected to a fixed part of said device whereby said rake wheel is resiliently supported from said device.

22. The structure of claim 18 wherein a spring is provided having one of its ends connected to said crank arm and its other end connected to a fixed part of said device whereby said rake wheel is resiliently supported from said device.

23. The structure of claim 21 wherein means is provided for adjusting the tension of said spring.

24. The structure of claim 22 wherein means is provided for adjusting the tension of said spring.

25. The structure of claim 1 in which the axis of rotation of said second part of said journal extends in a substantially horizontal direction when said device is in working position.

26. The structure of claim 2 in which the axis of rotation of said second part of said journal extends in a substantially horizontal direction when said device is in working position.

References Cited in the file of this patent

UNITED STATES PATENTS

| 2,670,588 | Plant | Mar. 2, 1954 |

FOREIGN PATENTS

| 517,070 | Great Britain | Jan. 19, 1940 |
| 1,076,339 | France | Apr. 21, 1954 |

OTHER REFERENCES

North Carolina Agricultural Experiment Station Information Circular No. 4, May 1951.